United States Patent [19]

Domeier

[11] Patent Number: 5,364,700
[45] Date of Patent: Nov. 15, 1994

[54] PREPREGABLE RESIN COMPOSITION AND COMPOSITE

[75] Inventor: Linda A. Domeier, Somerville, N.J.

[73] Assignee: Amoco Corporation, Chicago, Ill.

[21] Appl. No.: 813,839

[22] Filed: Dec. 27, 1985

[51] Int. Cl.$^5$ ............... B32B 27/14; C08F 22/40; C08F 222/40; C08G 73/10
[52] U.S. Cl. ..................... 428/394; 428/367; 428/408; 428/902; 525/282; 526/262; 528/322; 548/521
[58] Field of Search ............ 526/262, 90; 528/322; 548/521; 525/282; 428/473.5, 394, 902

[56] References Cited

U.S. PATENT DOCUMENTS

| | | | |
|---|---|---|---|
| 4,100,140 | 7/1978 | Zahir et al. | 526/89 X |
| 4,116,937 | 9/1978 | Jones et al. | 528/322 X |
| 4,298,720 | 11/1981 | Yamazaki et al. | 528/322 X |
| 4,323,662 | 4/1982 | Oba et al. | 525/282 X |
| 4,510,272 | 4/1985 | Loszewski | 528/322 X |
| 4,644,039 | 2/1987 | Boyd et al. | 528/322 X |
| 4,654,407 | 3/1987 | Domeier | 526/262 |

OTHER PUBLICATIONS

Fluoroelastomer-Modifies Thermoset Resins by Jovan Mijovic et al. "Rubber Modified Thermoset Resins", pp. 293–307 1984.
Rubber Toughened Polyimides, by A. J. Kinloch et al., "Rubber Modified Thermoset Resins", pp. 101–115, 1984.

Primary Examiner—Richard D. Lovering
Attorney, Agent, or Firm—Richard J. Schlott; Wallace L. Oliver

[57] ABSTRACT

Described herein are novel rubber modified bismaleimide resins and prepregable resin compositions comprising these bismaleimides and one or more liquid coreactants and optionally, one or more other additives.

24 Claims, No Drawings

PREPREGABLE RESIN COMPOSITION AND COMPOSITE

BACKGROUND OF THE INVENTION

Advanced composites are high strength, high modulus materials which are finding increasing use as structural components in aircraft, automotive, and sporting goods applications. Typically they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. However, most epoxy formulations absorb moisture which reduces their high temperature properties. As a result they are not suitable for use at 350° F. or greater in a moisture saturated condition. There is therefore a need for resin systems which afford composites which can retain a high level of properties at 350° F. under such moisture saturated conditions.

Most prepreg resins designed for use at 350° F. are made by combining bismaleimides of Formula I with liquid co-reactants containing other reactive groups such as amines, epoxides, cyanates or co-monomers containing —CH=CH$_2$, >C=CH$_2$, or —CH=CH— groups which can react or polymerize with the carbon-carbon double bonds of the maleimide groups.

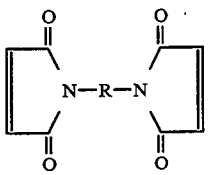

In common bismaleimides, R is the residue of an aromatic diamine such as methylene dianiline or m-phenylene diamine.

A major disadvantage of most resin formulations containing bismaleimides, however, is their generally brittle nature and, in turn, the lack of toughness and damage resistance of reinforced composites made from those resins. Bismaleimides having improved toughness, particularly as evidenced by improvements in composite properties, while maintaining high temperature performance, would provide a significant improvement over most of the currently available BMI resins.

SUMMARY OF THE INVENTION

This invention is directed to:
(i) bismaleimide resin formulations containing
(a) a bismaleimide of formula II where R is the residue of an aromatic

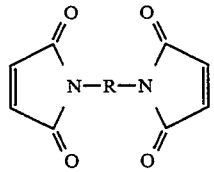

or aliphatic diamine,
(b) a liquid reactive diluent consisting primarily of compounds of the formula

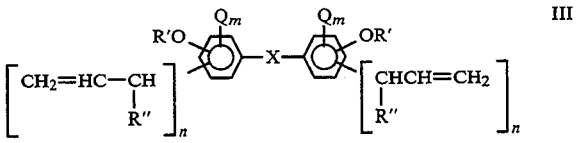

wherein R' represents hydrogen, alkyl or aryl; R" represents hydrogen or methyl; X represents a bivalent radical; Q represents halogen, alkyl or alkoxy; n has a value of from 1-2 and m has a value of from 0-3; and
(c) a rubber modifier
(ii) prepregable resin compositions comprising
(i) and one or more other co-reactants and optionally, other additives.

These compositions may optionally contain a structural fiber.

In the general formula II it is also meant to include compositions wherein up to 20% of the maleimide groups have been replaced by other terminal imide groups such as

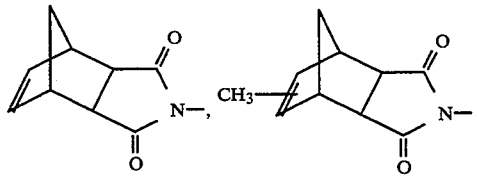

succinimide, phthalimide, and substituted maleimide, succinimide, or phthalimide groups.

The bismaleimides of formula II include, among others, methylene dianiline bismaleimide and derivatives thereof such as the BMI products sold under the names Compimide 353, Compimide 795 and Compimide 800, all sold by Boots-Technochemie of Nottingham, England. Other blends may also be used. The bismaleimides of this invention are made by condensing the appropriate diamines with maleic anhydride under dehydrating conditions. In the case of compounds containing up to 20% of other terminal imide groups, a portion of the maleic anhydride would be replaced by the appropriate anhydride such as nadic anhydride and others.

Processes for forming the bismaleimides from the diamines are well known in the art and are described in, for example, U.S. Pat. Nos. 3,839,287; 3,018,290; 4,376,206; 4,154,737; and 4,130,564.

The allyl diluents of this invention are characterized by the presence of two or more allyl or methallyl groups per aromatic nucleus. Diluents such as these are described in U.S. Pat. No. 4,100,140 and are also particularly exemplified by o,o'-diallyl bisphenol A and o,o'- diallyl bisphenol S (3,3'-diallyl-4,4'-dihydroxydiphenyl sulfone). The first diluent is available from Ciba-Geigy Corporation and the second diluent is available from Nikka, in Japan. Other similar diallyl diluents are described in U.S. Pat. No. 4,100,140 and may be readily prepared from most bisphenolic compounds. Blends of the above diallyl or polyallyl diluents with monoallylic diluents such as Eugenol (clove oil) and similar materials are also included. Blends of the above diluents with limited amounts of other liquid (<50% of the liquid ingredients), crosslinkable diluents such as dimethacrylates, allyl esters, and other suitable unsaturated liquids may also be used.

Examples of such liquid co-reactants would include N-vinyl-2-pyrrolidinone, ethylene glycol dimethacrylate, diethylene glycol dimethacrylate, trimethylolpropane triacrylate, trimethylolpropane trimethacrylate, pentaerythritol triacrylate, pentaerythritol tetraacrylate, pentaerythritol tetramethacrylate, triallyl isocyanurate, diallyl phthalate, triallyl trimellitate, divinyl benzene, dicyclopentadienyl acrylate, dicyclopentadienyl oxyethyl acrylate, vinylcyclohexene monoepoxide, 1,4-butanediol divinyl ether, 1,4-dihydroxy-2-butene, styrene, alpha methyl styrene, chlorostyrene, p-phenylstyrene, t-butylstyrene, phenyl vinyl ether, unsaturated polyesters, vinyl ester resins, and the like. These co-monomers are characterized by the presence of one or more —CH=CH$_2$, >C=CH$_2$, or —C=CH— groups which can polymerize with the maleimide groups of the bismaleimide.

The rubber modifiers of this invention are characterized as low Tg thermoplastics which are either soluble or dispersible in the BMI and diluent mixture. These range from lower molecular weight liquid polymers to higher molecular weight polymers which are gums or solid at room temperature. Such rubbers are exemplified by the butadiene homopolymers available from Arco Chemical Company as Poly-BD resins and from Nippon Soda Co., Ltd. as Nisso-PB resins. The Poly-BD resins are liquid (mw~3000), hydroxylterminated and contain about an 80/20 ratio of 1,4- to 1,2-unsaturation. The Nisso-PB resins are liquid and range in molecular weight from about 1000 to 3000. They contain over 90% 1,2-unsaturation and may be vinyl, hydroxyl, or carboxyl terminated.

Also typical are the butadiene/acrylonitrile copolymers available from B.F. Goodrich as Hycar Reactive Liquid Polymers. These can contain acrylic, amino, hydroxyl, or carboxyl terminal groups and may also contain pendant vinyl or carboxyl groups. Epoxy-terminated copolymers are also useful and are available from Spencer kellogg as Kelpoxy resins.

Other useful copolymers include the ethylene/acrylic resins available from DuPont as Vamac resins. Fluoroelastomers, such as the Viton resins also available from DuPont, may also be used as toughening modifiers.

Further examples include the higher molecular weight Hycar rubbers (from B.F. Goodrich) such as Hycar 1411, 1041, and 1441. Blends of such higher molecular weight rubbers with lower molecular weight rubbers may be particularly useful.

Other rubber modifiers include the Nordel hydrocarbon rubbers (ethylene, propylene, and 1,4-hexadiene copolymers) available from DuPont, the epichlorohydrin polymers and copolymers available from B.F. Goodrich (Hydrin resins) and others. Dispersible or soluble examples of other elastomers from a variety of polymer types are also included within the scope of this invention.

Silicone rubbers having a range of molecular weights and structures may also be used and are exemplified by L-45 and Y-7942 materials available from Union Carbide Corporation.

An additional class of modifiers would include vinyl acetate polymers and copolymers such as LPS-40A manufactured by Union Carbide Corporation and similar materials which are generally described as low profile additives. Such thermoplastics are often added to thermoset polyesters to reduce shrinkage during cure.

Blends of any of the above rubbers are also within the scope of this invention. The above list is not intended to limit the nature of those rubber modifiers which may be used to improve the toughness of the thermoset bismaleimide formulations.

Resins based on the above combination of ingredients are of particular interest in that the unmodified BMI/allyl diluent mixtures are generally inherently tougher as indicated by tensile elongation than most bismaleimide formulations. It is desirable in using rubber modifiers to improve toughness to blend such rubber modifiers with a thermoset matrix which already possesses a relatively tough nature while still providing the high temperature capability required in many applications. The allyl diluents in the formulations described above provide a high level of inherent toughness in the unmodified resins and are therefore preferred over other available diluents.

Additional co-reactants which may be used in these formulations include epoxy resins which contain one or more epoxy groups having the following formula:

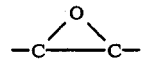

The epoxy groups can be terminal epoxy groups or internal epoxy groups. The epoxides are of two general types: polyglycidyl compounds or products derived from epoxidation of dienes or polyenes. Polyglycidyl compounds contain a plurality of 1,2-epoxide groups derived from the reaction of a polyfunctional active hydrogen containing compound with an excess of an epihalohydrin under basic conditions. When the active hydrogen compound is a polyhydric alcohol or phenol, the resulting epoxide resin contains glycidyl ether groups. A preferred group of polyglycidyl compounds are made via condensation reactions with 2,2-bis(4-hydroxyphenyl)propane, also known as bisphenol A, and have structures such as IV.

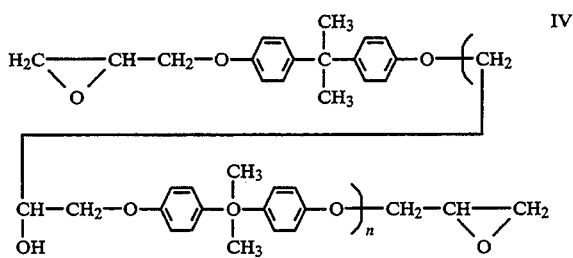

where n has a value from about 0 to about 15. These epoxides are bisphenol-A epoxy resins. They are available commercially under the trade names such as "Epon 828," "Epon 1001", and "Epon 1009" from Shell Chemical Co., and as "DER 331", and "DER 334" from Dow Chemical Co. The most preferred bisphenol A epoxy resins have an "n" value between 0 and 10.

Polyepoxides which are polyglycidyl ethers of 4,4'-dihydroxydiphenyl methane, 4,4'-dihydroxydiphenyl sulfone, 4,4'-biphenol, 4,4'-dihydroxydiphenyl sulfide, phenolphthalein, resorcinol, 4,2'-biphenol, or tris(4-hydroxyphenyl) methane and the like, are useful in this invention. In addition, EPON 1031 (a tetraglycidyl derivative of 1,1,2,2-tetrakis(hydroxyphenyl)ethane from Shell Chemical Company), and Apogen 101, (a methylolated bisphenol A resin from Schaefer Chemical Co.) may also be used. Halogenated polyglycidyl compounds such as D.E.R. 580 (a brominated bisphenol A epoxy resin from Dow Chemical Company) are also useful. Other suitable epoxy resins include polyepoxides prepared from polyols such as pentaerythritol, glycerol, butanediol or trimethylolpropane and an epihalohydrin.

Polyglycidyl derivatives of phenol-formaldehyde novolaks such as V where n=0.1 to 8 and cresolformaldehyde novolaks such as VI where n=0.1 to 8 are also usable.

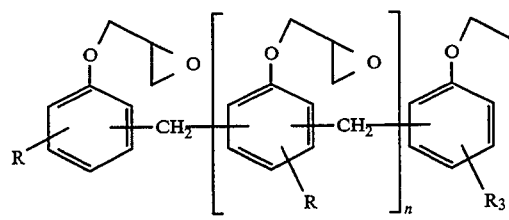

-continued
V  R = H
VI  R = CH$_3$

The former are commercially available as D.E.N. 431, D.E.N. 438, and D.E.N. 485 from Dow Chemical Company. The latter are available as, for example, ECN 1235, ECN 1273, and ECN 1299 (obtained from Ciba-Geigy Corporation, Ardsley, N.Y.). Other epoxidized novolaks such as SU-8 (obtained from Celanese Polymer Specialties Company, Louisville, Ky.) are also suitable.

Other polyfunctional active hydrogen compounds besides phenols and alcohols may be used to prepare the polyglycidyl adducts of this invention. They include amines, aminoalcohols and polycarboxylic acids.

Adducts derived from amines include N,N-diglycidyl aniline, N,N-diglycidyl toluidine, N,N,N',N'-tetraglycidylxylylene diamine, (i.e., VII) N,N,N',N'-tetraglycidyl-bis (methylamino) cyclohexane (VIII), N,N,N',N'-tetraglycidyl-4,4'-diaminodiphenyl methane, (i.e. IX) N,N,N',N'-tetraglycidyl-3,3'-diaminodiphenyl sulfone, and N,N'-dimethyl-N,N'-diglycidyl-4,4'-diaminodiphenyl methane. Commercially available resins of this type include Glyamine 135 and Glyamine 125 (obtained from F.I.C. Corporation, San Francisco, Calif.), Araldite MY-720 (obtained from Ciba-Geigy Corporation) and PGA-X and PGA-C (obtained from The Sherwin Williams Co., Chicago, Ill.).

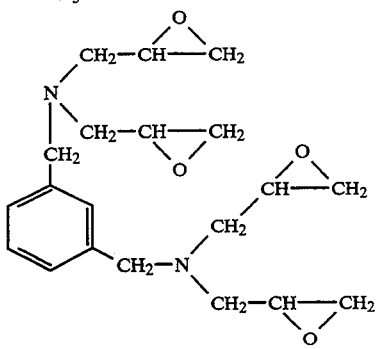

VII

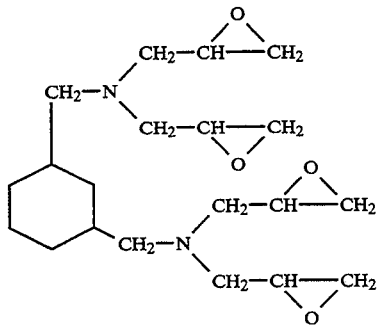

VIII

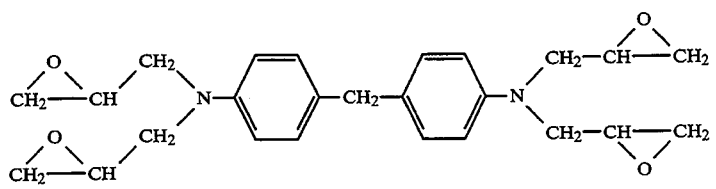

IX

Suitable polyglycidyl adducts derived from amino alcohols include O,N,N-triglycidyl-4-aminophenol, available as Araldite 0500 or Araldite 0510 (obtained from Ciba-Geigy Corporation) and O,N,N-triglycidyl-3-aminophenol (available as Glyamine 115 from F.I.C. Corporation).

Also suitable for use herein are the glycidyl esters of carboxylic acids. Such glycidyl esters include, for example, diglycidyl phthalate, diglycidyl terephthalate, diglycidyl esophthalate, and diglycidyl adipate. There may also be used polyepoxides such as triglycidyl cyanurates and isocyanurates, N,N-diglycidyl oxamides, N,N'-diglycidyl derivatives of hydantoins such as "XB 2793" (obtained from Ciba-Geigy Corporation), diglycidyl esters of cycloaliphatic dicarboxylic acids, and polyglycidyl thioethers of polythiols.

Other epoxy-containing materials are copolymers of acrylic acid esters of glycidol such as glycidyl acrylate and glycidyl methacrylate with one or more copolymerizable vinyl compounds. Examples of such copolymers are 1:1 styrene-glycidyl methacrylate, 1:1 methyl methacrylate-glycidyl acrylate and 62.5:24:13.5 methyl methacrylate:ethyl acrylate:glycidyl methacrylate.

Silicone resins containing epoxy functionality, e.g., 2,4,6,8,10-pentakis [3-(2,3-epoxypropoxy)propyl]-2,4,6,8,10-pentamethylcyclopentasiloxane and the diglycidyl ether of 1,3-bis-(3-hydroxypropyl)tetramethyldisiloxane) are also usable.

The second group of epoxy resins is prepared by epoxidation of dienes or polyenes. Resins of this type include bis(2,3-epoxycyclopentyl) ether, X

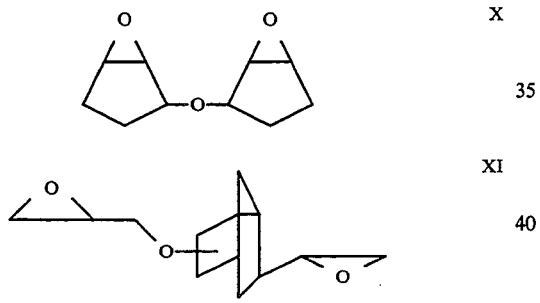

reaction products of X with ethylene glycol which are described in U.S. Pat. No. 3,398,102, 5(6)-glycidyl-2-(1,2-epoxyethyl)bicyclo[2.2.1] heptane, XI, and dicyclopentadiene diepoxide. Commercial examples of these epoxides include vinylcyclohexene dioxide, e.g., "ERL-4206" (obtained from Union Carbide Corporation), 3,4-epoxycyclohexylmethyl 3,4-epoxycyclohexane carboxylate, e.g., "ERL-4221" (obtained from Union Carbide Corporation), 3,4-epoxy-6-methylcyclohexylmethyl 3,4-epoxy-6-methylcyclohexane carboxylate, e.g., "ERL 4201" (obtained from Union Carbide Corporation), bis(3,4-epoxy-6-methylcyclohexylmethyl) adipate, e.g., "ERL-4289" (obtained from Union Carbide Corporation), dipentene dioxide, e.g., "ERL-4269" (obtained from Union Carbide Corporation), 2-(3,4-epoxycyclohexyl-5,5-spiro-3,4-epoxy)cyclohexanemetadioxane, e.g., "ERL-4234" (obtained from Union Carbide Corporation) and epoxidized poly-butadiene, e.g., "Oxiron 2001" (obtained from FMC Corporation).

Other suitable cycloaliphatic epoxides include those described in U.S. Pat. Nos. 2,750,395; 2,890,194; and 3,318,822 which are incorporated herein by reference, and the following:

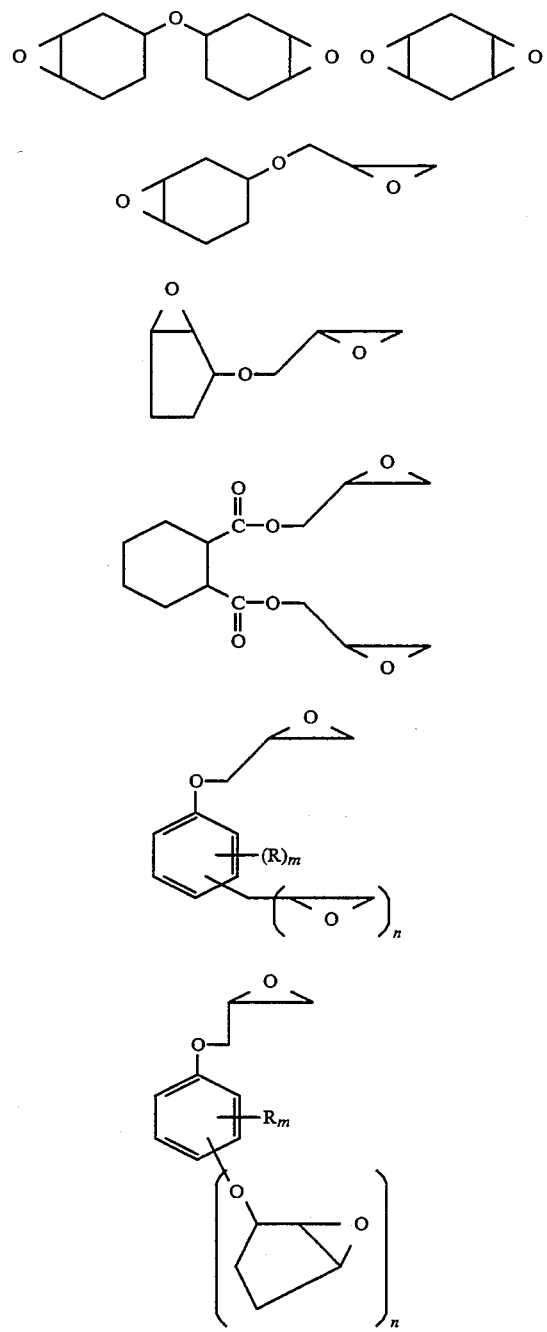

where n is 1 to 4, m is (5-n), and R is H, halogen or $C_1$ to $C_4$ alkyl.

If epoxy resins are used, it is desirable to add an aromatic diamine to the formulation. The diamine should have a low level of reactivity with epoxy resin and the bismaleimide at room temperature. Suitable diamines include 4,4'-diaminodiphenyl sulfone, 3,3'-diaminodiphenyl sulfone, 3,4'-diaminobenzophenone, 4,4'-diaminobenzophenone, 4,4'-bis(3-aminophenoxy)-diphenylsulfone, 2,2-bis(4-aminophenoxyphenyl)propane, and the like. A stoichiometry of 0.1 to 1.2 equivalents of -NH per equivalent of (1,2-epoxide group plus maleimide group) may be used.

Diamines may also be used even if no epoxy is used. In this case the diamines may react during the cure cycle with the bismaleimides. When epoxides are present, the diamines may react with either the epoxy or maleimide groups.

The composition may additionally contain an accelerator to increase the rate of cure of the epoxy plus amine reaction. Accelerators which may be used herein include Lewis acids; amine complexes such as BF$_3$.monoethylamine, BF$_3$.piperdine, BF$_3$.2-methylimidazole; amines, such as imidazole and its derivatives such as 4-ethyl-2-methylimidazole, 1-methylimidazole, 2-methylimidazole; N,N-dimethylbenzylamine; acid salts of tertiary amines, such as the p-toluene sulfonic acid:imidazole complex, salts of trifluoromethane sulfonic acid, such as FC-520 (obtained from 3M Company), organophosphonium halides and dicyandiamide. If used, the accelerator may be from 1 to 6 percent by weight of the epoxy component.

The compositions of this invention may optionally include other non-elastic thermoplastic polymers. These materials have beneficial effects on the viscosity and film strength characteristics of the bismaleimide/liquid co-reactant mixture.

The additional thermoplastic polymers used in part (ii) of this invention include polyarylethers of formula XII which are described in U.S. Pat. Nos. 4,108,837 and 4,175,175,

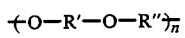   XII where R' is a residuum of a dihydric phenol such as bisphenol A, hydroquinone, resorcinol, 4,4-biphenol, 4,4'-dihydroxydiphenyl sulfone, 4,4'-dihydroxy-3,3',5,5'-tetramethyldiphenyl sulfide, 4,4'-dihydroxy-3',3',5,5'-tetramethyldiphenyl sulfone and the like. R" is a residuum of a benzenoid compound susceptible to nucleophilic aromatic substitution reactions such as 4,4'-dichlorodiphenyl sulfone, 4,4'-difluorobenzophenone, and the like. The average value of n is from about 8 to about 120.

Other suitable polyarylethers are described in U.S. Pat. No. 3,332,209.

Also suitable are polyhydroxyethers of the formula:

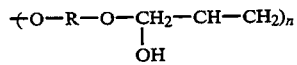   XIII where R has the same meaning as R' for Formula XII and the average value of n is between about 8 and about 300; and polycarbonates such as those based on bisphenol A, tetramethyl bisphenol A, 4,4'-dihydroxydiphenyl sulfone, 4,4'-dihydroxy-3,3',5,5' tetramethyl diphenyl sulfone, hydroquinone, resorcinol, 4,4'-dihydroxy-3,3',5,5'-tetramethyl diphenyl sulfide, 4,4'biphenol, 4,4'-dihydroxy- diphenol sulfide, phenolphthalein, 2,2,4,4-tetramethyl-1,3-cyclobutane diol, and the like. Other suitable thermoplastics include poly(epsilon-caprolactone); poly(ethylene terephthalate); polyetherimides such as the Ultem resins (obtained from the General Electric Company); polyamides such as nylon 6, nylon 6,6, nylon 6,12, and Trogamid T (obtained from Dynamit Nobel Corporation); poly(amideimides) such as Torlon poly(amideimide) (obtained from Amoco Chemical Corporation, Napierville, Ill.); polyolefins, polyethylene oxide; poly)butyl methacrylate); impact-modified polystyrene; sulfonated polyethylene; polyarylates such as those derived from bisphenol A and isophthalic and terephthalic acid; poly(2,6-dimethyl phenylene oxide); polyvinyl chloride and its copolymers; polyacetals; polyphenylene sulfide and the like.

The preferred thermoplastics include polyetherimides, polysulfones, phenoxy resins, and polyarylates.

The structural fibers which are useful in this invention include carbon, graphite, glass, silicon carbide, poly(benzothiazole), poly(benzimidazole), poly(benzoxazole), aluminum, titanium, boron, and aromatic polyamide fibers. These fibers are characterized by a tensile strength of greater than 100,000 psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers, such as Kevlar 49 fiber (obtained from E.I. duPont de Nemours, Inc., Wilmington, Del.), and silicon carbide fibers.

Additional components in the composition can include initiators for vinyl polymerization such as di-t-butyl peroxide, dicumyl peroxide, 1,1-bis(t-butylperoxy)cyclohexane, azo-bis(isobutyronitrile), t-butyl perbenzoate, and the like. The initiator comprises from 0 to 3 percent by weight of the total composition.

Inhibitors for vinyl polymerizations may also be used. They include hydroquinone, t-butyl hydroquinone, benzoquinone, p-methoxyphenol, and 4-nitro-m-cresol. Inhibitors are present in amounts of from 0 to 2 percent by weight of the total composition.

When a structural fiber is used, the amount of fiber in the total composition is between about 10 and about 90 percent by weight, preferably between about 20 to about 85 percent by weight.

Preimpregnated reinforcement may be made from the compositions of this invention by combining component ii with a structural fiber.

Preimpregnated reinforcement such as tow or tape, may be prepared by several techniques known in the art, such as wet winding or hot melt.

Composites may be prepared by curing the preimpregnated reinforcement using heat and optionally pressure. Vacuum bag/autoclave cures work well with these compositions. Laminates may also be prepared via wet layup followed by compression molding, resin transfer molding, or by resin injection, as described in European Patent Application 0019149 published Nov. 26, 1980. Typical care temperatures are 100° F. to 600° F., preferably 180° F. to 490° F.

The compositions of this invention may also be used for filament winding. In this composite fabrication process, continuous reinforcement in the form of tape or tow—either previously impregnated with resin or impregnated during winding—is placed over a rotating and removable form or mandrel in a previously determined pattern. Generally, the shape is a surface of revolution and contains end closures. When the proper number of layers are applied, the wound form is cured in an oven or autoclave and the mandrel removed.

Tacky drapable prepreg can be obtained with a wide variety of compositions. Long prepreg shelf lives can be obtained—typically one to four weeks.

The compositions of this invention may be used as matrix resins for composites, high temperature coatings, and adhesives. When reinforced with structural fibers, they may be used as aircraft parts such as wing skins, wing-to-body fairings, floor panels, flaps, radomes; as automotive parts such as driveshafts, bumpers, and springs; and as pressure vessels, tanks and pipes. They are also suitable for protective armor on military vehicles and sporting goods applications such as golf shafts, tennis rackets, and fishing rods.

In addition to structural fibers, the composition may also contain particulate fillers such as talc, mica, calcium carbonate, aluminum trihydrate, glass microballoons, phenolic thermospheres, and carbon black. Up to half of the weight structural fiber in the composition may be replaced by filler. Thixotropic agents such as fumed silica may also be used.

Examples

The following examples serve to give specific illustrations of the practice of this invention but they are not intended in any way to limit the scope of this invention.

EXAMPLE 1

A mixture of 490 g methylene dianiline bismaleimide (MDA BMI), 410 g of o,o'-diallylbisphenol A, (DABA) and 10 parts of Hycar VTBN 1300X22 was stirred together at 140° under vacuum. After about 30 minutes, degassing appeared complete and the resin was discharged and filtered through a screen into small storage pans. The resin was then fabricated into carbon fiber prepreg sheets (T-300 fiber) and the prepreg was used to prepare composites for edge delamination testing. After an autoclave cure (2 hours at 175° F. plus 4 hours at 350° F. using 3° F./min heating rates) and oven postcure (4 hours at 246° C. with a 1° C./min heating rate and 1.5° C./min cooling rate), the composites were cut into edge delamination specimens and tested. This 10 ply layup had the following orientation: [(±25)₂/90]ₛ. The composite had an edge delamination strength of 37.5 Ksi±3.7%. The fiber volume fraction was 68.4%. The Tg of the neat cured resin was about 285° C.

CONTROL EXAMPLE A

The procedure of Example 1 was repeated using 540 parts of MDA BMI and 460 parts of o,o'-diallylbisphenol A. A composite plate was similarly prepared and tested. The edge delamination strength was 31.5 Ksi±10.1%. The fiber volume fraction was 65.4%.

The MDA BMI and diallyl diluent in the above examples were obtained from Ciba-Geigy as XU-292, components A and B.

EXAMPLES 2–9

The procedure of Examples A and 1 was repeated using the resin formulations and fibers shown in Table I below. In Table I certain of the terms employed are identified as follows:

EDS=Edge delamination strength.
EGDM=Ethylene glycol dimethylacrylate
TAIC=Triallyl isocyanurate
PSF/PKHH=50:50 weight per cent mixture of UDEL
polysulfone and phenoxy resin.
DEN=Epoxy Novolak resins sold by Dow.
T-40 and T-300 are Thornel carbon fibers sold by Union Carbide Corporation.
A,B,C and D which precedes the fiber designation in Table I designates single lots of the particular carbon fiber.

TABLE I

| Ex. No. | Bismaleimide | Diluent | Modifier | Tg(C.) | EDS | Fiber |
|---|---|---|---|---|---|---|
| A | 54 MDA BMI | 46 DABA | — | 287 | 31.5 | A(T-300) |
| 1 | 49 MDA BMI | 41 DABA | 10 VTBN | 287 | 37.5 | A(T-300) |
| 2 | 48.5 MDA BMI | 36.5 DABA | 15 VTBM | 295 | 39.4 | A(T-300) |
| 3 | 46.6 MDA BMI | 28.3 DABA<br>8.4 EGDM | 8.4 VTBN<br>8.4 DEN 438 | 240 | 43.0 | A(T-300) |
| 4 | 39 MDA BMI | 28 DABA | 5 VTBN<br>28 DEN 439 | 240 | 33.3 | A(T-300) |
| 5*  | 46 MDA BMI | 26 DABA<br>6 EGDM<br>3 TAIC | 8 VTBN<br>8 DEN 438<br>3 PSF/PKHH | >300 | 36.4 | A(T-300) |
| 6* | 44 MDA BMI | 25 DABA<br>2.5 EGDM<br>3 TAIC | 7.5 VTBN<br>15 DEN 438<br>3 PSF/PKHH | 240 | 35.5 | A(T-300) |
| B | 54 MDA BMI | 46 DABA | — | 287 | 29.8 | B(T-300) |
| 7 | 49 MDA BMI | 41 DABA | 10 VTBN | 287 | 35.7 | B(T-300) |
| 8** | 49 MDA BMI | 41 DABA | 10 VTBN | 267 | 40.8 | B(T-300) |
| C | 54 MDA BMI | 46 DABA | — | 287 | 25.4 | C(T-40) |
| 9 | 49 MDA BMI | 41 DABA | 10 VTBN | 287 | 30.1 | C(T-40) |
| 10 | 49 MDA BMI | 41 DABA | 10 CTBN × 8 | 292 | 28.5 | D(T-300) |
| 11 | 49 MDA BMI | 41 DABA | 10 VTBN × 8 | — | 32.5 | D(T-300) |

\* = Double postcure
\*\* = Postcured at 235° C. instead of 246° C.

It is evident from the data set forth in Table I that the rubber modified bismaleimides of this invention have desirable edge delamination strengths as well as other properties which render them suitable for a wide variety of applications.

Although the invention has been illustrated by the preceding examples it is not to be construed as being limited to the materials employed therein, but rather, the invention encompasses the generic area as hereinbefore disclosed. Various modifications can be made without departing from the spirit or scope thereof.

What is claimed is:

1. As a prepregable resin composition, a bismaleimide resin formulation comprised of:
   (a) a bismaleimide of the formula:

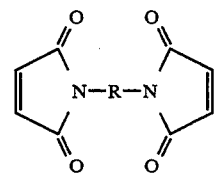

wherein R is the residue of an aromatic or aliphatic diamine, (b) a liquid reactive diluent of the formula:

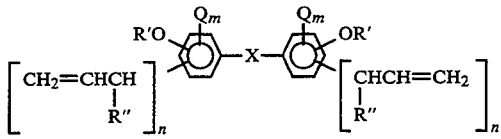

wherein R' represents hydrogen, alkyl or aryl; R" represents hydrogen or methyl; X represents a bivalent radical; Q represents halogen, alkyl or alkoxy; n has a value of from 1–2 and m has a value of from 0–3; and (c) a rubber modifier.

2. The bismaleimide resin formulation of claim 1 wherein R is:

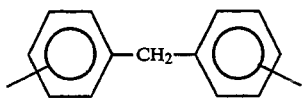

3. The bismaleimide resin formulation of claim 1 wherein R is a mixture of at least two members selected from the group of:

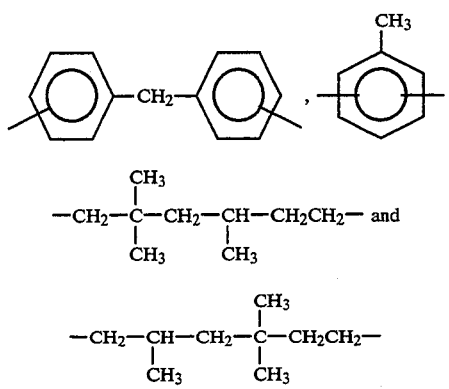

4. The bismaleimide resin formulation of claim 1 wherein X represents a divalent hydrocarbon radical, R' and R" are hydrogen, n has a value of 1 and m has a value of 0.

5. The bismaleimide resin formulation of claim 1 wherein said reactive diluent is o,o'-diallylbisphenol A.

6. The bismaleimide resin formulation of claim 1 wherein said rubber modifier is a butadiene homopolymer.

7. The bismaleimide resin of claim 1 wherein said rubber modifier is a butadiene copolymer.

8. The bismaleimide resin of claim 1 wherein said rubber modifier is a butadiene/acrylonitrile copolymer.

9. The bismaleimide resin of claim 1 wherein said rubber modifier is an ethylene/acrylic copolymer.

10. The bismaleimide resin of claim 1 wherein the rubber modifier is a vinyl acetate polymer or copolymer.

11. The bismaleimide resin of claim 1 wherein said rubber modifier is a silicone rubber.

12. The prepregable resin as defined in claim 1 wherein said liquid coreactant is an unsaturated monomer or mixture of monomers containing a $>C=CH_2$, $-CH=CH_2$, or $-CH=CH-$ group.

13. The prepregable resin composition of claim 1 wherein the liquid coreactant is triallyl isocyanurate.

14. The prepregable resin composition of claim 1 wherein the liquid coreactant is ethylene glycol.

15. The prepregable resin composition of claim 1 wherein the liquid coreactant is an epoxy resin or mixture of epoxy resins.

16. The prepregable resin composition of claim 15 wherein the epoxy resin is a polyglycidyl compound derived from an aromatic polyphenol or a polyamine.

17. The prepregable resin composition of claim 15 wherein the epoxy resin is a cycloaliphatic polyepoxide.

18. The prepregable resin composition of claim 1 wherein the additive is an aromatic amine.

19. The prepregable resin composition of claim 1 wherein the liquid coreactant is an epoxy resin or mixture of epoxy resins and the additive is an aromatic diamine.

20. The prepregable resin composition of claim 1 which contains a thermoplastic polymer as an additive.

21. The prepregable resin composition of claim 20 wherein the thermoplastic polymer is selected from one or more of a poly(aryl ether), a polyhydroxyether, a polycarbonate, a polyetherimide, a poly(epsiloncaprolactone), a polyester, a polyamide, a poly(amideimide), a polyolefin, a polyethylene oxide, a polybutyl methacrylate, an impact-modified polystyrene, a polyarylate, poly(2,6-dimethylphenylene oxide) polyphenylene sulfide and polyacetals.

22. The prepregable resin composition of claim 1 which contains a free radical inhibitor, a free radical initiator, or other accelerators, or fillers.

23. The prepregable resin composition of claim 1 which contains a structural fiber selected from carbon, graphite, glass, silicon carbide, poly(benzothiazole), poly(benzimidazole), poly(benzoxazole), aluminum, titanium, boron and aromatic polyamides.

24. A composite comprising:
  (i) a matrix resin comprising:
    (a) the bismaleimide resin formulation of claim 1,
    (b) one or more liquid coreactants, and optionally other additives, and
  (ii) a structural fiber.

* * * * *